United States Patent [19]

Mitchell et al.

[11] 4,046,073

[45] Sept. 6, 1977

[54] ULTRASONIC TRANSFER PRINTING WITH MULTI-COPY, COLOR AND LOW AUDIBLE NOISE CAPABILITY

[75] Inventors: Joan LaVerne Mitchell, Peekskill; Keith Samuel Pennington, Somers, both of N.Y.; Frederick Hochberg, deceased, late of Yorktown Heights, N.Y., by Lee Hochberg, administratrix

[73] Assignee: International Business Machines Corporation, Armonk, N.Y.

[21] Appl. No.: 653,169

[22] Filed: Jan. 28, 1976

[51] Int. Cl.$^2$ .......................... B41J 3/20; G01D 9/00

[52] U.S. Cl. .......................... 101/426; 101/1; 101/DIG. 5; 197/1 R; 346/1; 427/57

[58] Field of Search .................. 101/1, 426, DIG. 13, 101/DIG. 5; 197/1 R; 346/135, 1 R; 427/57; 178/6.6 R; 228/1 R, 33; 355/1 R; 118/57; 204/157.1 S

[56] References Cited

U.S. PATENT DOCUMENTS

| | | | |
|---|---|---|---|
| 3,029,766 | 4/1962 | Jones | 228/33 |
| 3,112,693 | 12/1963 | Williams | 101/1 X |
| 3,117,256 | 1/1964 | Gamblin | 101/1 X |
| 3,159,099 | 12/1964 | Wadey | 101/1 X |
| 3,242,855 | 3/1966 | Noll et al. | 197/1 R X |
| 3,267,845 | 8/1966 | Simshauser | 101/1 X |
| 3,270,637 | 9/1966 | Clark | 355/1 |
| 3,280,740 | 10/1966 | Balamuth et al. | 101/1 X |
| 3,308,475 | 3/1967 | Bean | 101/1 X |
| 3,369,253 | 2/1968 | Sihvonen | 346/135 X |
| 3,409,904 | 11/1968 | Maiershofer | 101/1 X |
| 3,418,427 | 12/1968 | Jones | 101/1 X |
| 3,489,241 | 1/1970 | Steinberg | 228/1 |
| 3,649,358 | 3/1972 | Johnston | 427/57 |
| 3,741,117 | 6/1973 | Bienert et al. | 101/1 |
| 3,790,703 | 2/1974 | Carley | 101/335 X |
| 3,791,028 | 2/1974 | Missel | 228/1 X |
| 3,816,838 | 6/1974 | Higaki et al. | 427/57 X |
| 3,817,785 | 6/1974 | Abitboul | 427/57 X |
| 3,907,089 | 9/1975 | Montoya | 101/1 X |
| 3,919,934 | 11/1975 | Beery | 101/1 X |

FOREIGN PATENT DOCUMENTS

| | | | |
|---|---|---|---|
| 1,422,575 | 1/1965 | France | 427/57 |
| 2,342,021 | 8/1973 | Germany | 197/1 R |
| 2,313,335 | 3/1973 | Germany | 197/1 R |
| 2,328,127 | 12/1973 | Germany | 197/1 R |

OTHER PUBLICATIONS

"Ink on Demand", Mitchell & Pennington, IBM Tech. Discl. Bulletin, vol. 18, No. 2, July 1975, pp. 608-609.

"Acoustic Holographic Printer", McCormack & McDonnell, IBM Tech Discl. Bull., vol. 13, No. 6, Nov. 1970, p. 1621.

*Primary Examiner*—E. H. Eickholt
*Attorney, Agent, or Firm*—Philip Young

[57] ABSTRACT

A printing or copying system in which ink is transferred from an ink-bearing medium to a printing medium through the use of ultrasonics. The ink-bearing medium may be an ink ribbon, carbon paper or the like which is in contact with a printing medium such as paper. Ultrasonic energy is applied to the ink-bearing medium through transmission fibers, wires or bundles thereof, causing the viscosity of the ink to be reduced due to the ultrasonic vibrations and conversion of the ultrasonic energy into heat such that the ink is transferred to the printing medium. Multi-copy capability is achieved by having alternate layers of carbon paper or the like in contact with the paper.

29 Claims, 9 Drawing Figures

FIG. 1
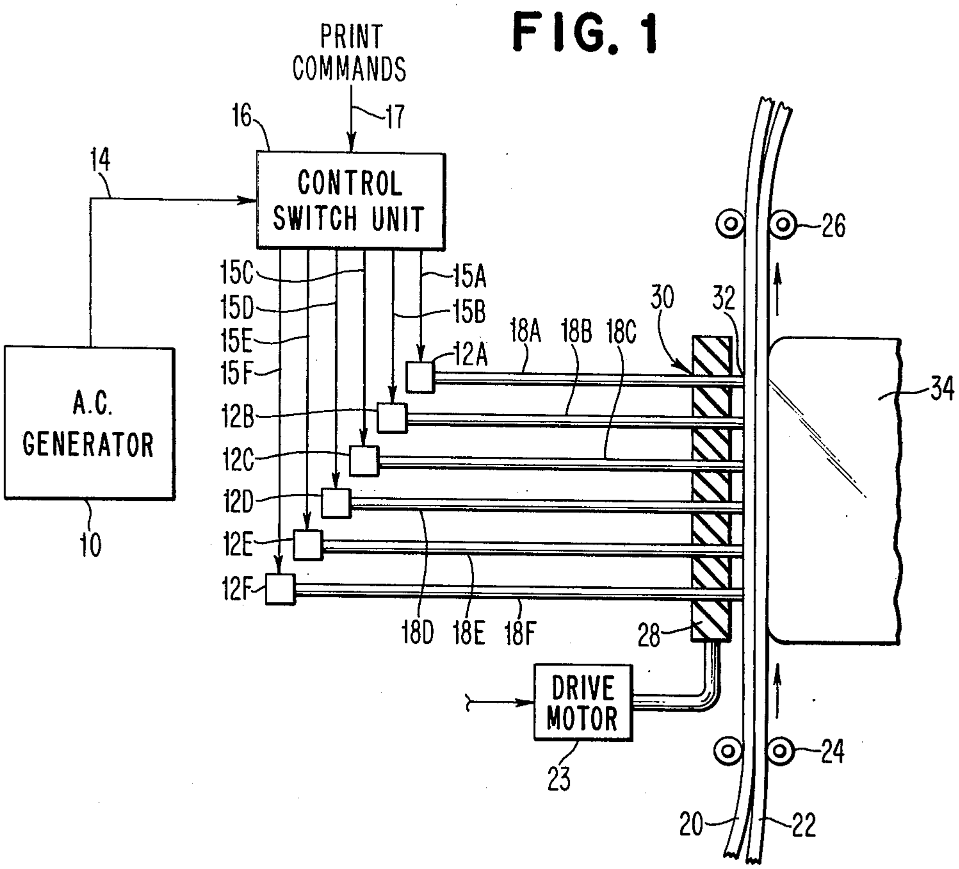
FIG. 2A
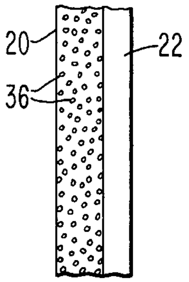
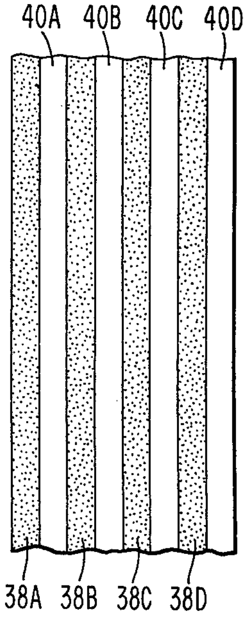
FIG. 2B

ULTRASONIC TRANSFER PRINTING WITH MULTI-COPY, COLOR AND LOW AUDIBLE NOISE CAPABILITY

BACKGROUND OF THE INVENTION

The present invention relates to printing and, more particularly, to printing other than lithography, letterpress and gravure.

The conventional printing techniques such as lithography, letterpress and gravure require the use of a plate which is prepared with inked areas forming the image to be printed. More recently, there have been developed various ink jet printing systems which generally involve the directing of ink particles from jet nozzles and the selective application or deposition of such ink particles onto a print medium. These ink jet printing systems, while providing many desirable advantages over other print techniques, are however, not suitable for simultaneous multiple copy applications.

U.S. Pat. No. 3,790,703 to Carley discloses a printing system in which a fluid stream is thermal viscosity modulated by time varying the temperature of the stream in response to an intelligence signal. The thermal viscosity modulation of the fluid stream is accomplished by passing a plurality of fluid ink streams under pressure through capillary tubes having thin film resistors on their walls, and impressing the scanned original electrical signals through the resistors to selectively heat the fluid ink stream. The thermally produced variations in the viscosity of the fluid ink stream correspondingly alter the ink flow through the capillary tubes. Electrostatic ink transfer techniques may also be employed with the disclosed thermal viscosity modulation system. The use of thermal viscosity modulation is dependent on thermal conductivity with its inherent thermal spreading problems, which may affect the quality and resolution of the print. Also, it is generally only capable of single copy printing.

U.S. Pat. No. 3,270,637 to H. E. Clark discloses a printing system which utilizes an electro-viscous liquid. In response to the application of a writing signal, such as an applied voltage, the liquid increases in viscosity and the system does not print. Conversely, in the absence of an applied signal the viscosity of the liquid decreases and the system prints. Other forms of energy such as light, etc., may be used as the energizing signal for controlling the viscosity of the electro-viscous liquid.

U.S. Pat. No. 3,369,253 to Sihvonen discloses a printing system in which a normally solid non-aqueous ink is heated, with the liquified ink being used for printing purpose.

SUMMARY OF THE INVENTION

It is an object of the present invention to provide a printing system with high quality and resolution. It is another object to provide a system which prints at high speeds. It is a further object to provide a printing system with multi-copy capability.

these and other objects are achieved by the present invention which provides a printing or copying system in which ink is transferred from an ink-bearing medium to a printing medium through the use of ultrasonics. The ink-bearing medium may be an ink ribbon, carbon paper or the like which is in contact with a printing medium such as paper. A source of ultrasonic energy is connected to modulation apparatus which applies the selectively modulated ultrasonic energy through wires or bundles of fibers, constituting ultrasonic transmission means, to the ink-bearing medium. In the no shear condition, the viscosity of the ink is too large to result in ink transfer from the ink-bearing medium to the paper. The presence of locally applied ultrasonic energy on the ink-bearing medium results in increased temperature due to ultrasonic absorption, increased shear, possibly cavitation, and an increased hydrostatic pressure due to acoustic streaming. Where the ink-bearing medium is a carbon paper or ink ribbon, the absorbed ultrasonic energy causes the ink to flow and be transferred to printing paper by capillary or adhesive forces. On the other hand, where the ink-bearing medium is a porous body, the ultrasonic energy produces a decrease in viscosity of the ink which permits the ink to seep from the porous media and be transferred to the paper. Variation of the acoustic power and/or duration of pulse in each fiber in turn controls the amount of ink transferred at a given print position. Use of fine sonic fibers achieve a high resolution ultrasonic matrix printer. Also, multiple copies can be simultaneously produced by having alternate layers of the ink-bearing medium and paper. Similarly, multi-color capability is provided by employing ink bearing media with inks of different colors. The above printing applications involving an ultrasonic energy source are accompanied by a low audible noise operation.

BRIEF DESCRIPTION OF THE DRAWINGS

FIG. 1 is a schematic of an ultrasonic printer illustrative of one embodiment of the invention;

FIG. 2A shows one embodiment of the ultrasonic printer wherein the ink-bearing medium is a porous medium;

FIG. 2B shows one form of the ink-carrying medium and paper wherein the ultrasonic printer is employed for multi-copy operation;

DESCRIPTION OF THE PREFERRED EMBODIMENTS

Figure 3:
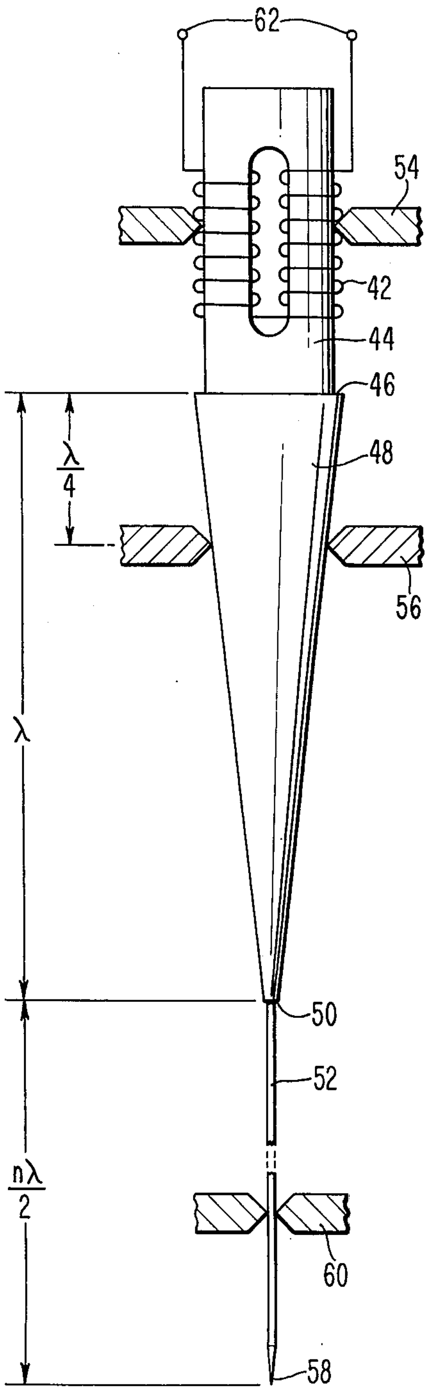
FIG. 3 shows a magnetostrictive transducer for producing modulated ultrasonic energy into the sonic transmission media.

Referring to FIG. 1 there is shown the ultrasonic printer which includes an A.C. generator 10 in the 20–200 kHz range. The generator 10 delivers current to ultrasonic transducers 12A–12F via wire 14 and control unit 16. The ultrasonic transducers 12A–12F, such as piezoelectric or magnetostrictive transducers, convert electrical signal energy to ultrasonic energy. Each of the ultrasonic transducers 12A–12F is connected to respective output lines of the control unit 16. Control unit 16 is simply a conventional electrical gating device which couples the electrical signal on input line 14 to any combination of output lines 15A–15F in response to input command signals on line 17. The signals on output lines 15A–15F selectively operate the devices 12A–12F. The selectively modulated ultrasonic energy is coupled via acoustic fibers 18A–18F to an ink-bearing media 20, such as carbon paper, or a porous media containing ink such as a thixotropic ink. The print paper is illustrated by the web 22. The media 20 and web 22 may be constituted by a single sheet of thermal paper or other thermally triggered medium. In the serial mode of printing, the print head constituted by the ends of fibers 18A–18F moves across the media 20 by motor drive 23 transferring ink under command. Upon completion of a printed line, both the ink-bearing media 20 and the print paper 22 are advanced by pairs of drive rollers 24 and 26 in the direction shown by arrows, and the process is repeated. It should be understood that other modes of printing, such as line printing mode, can be used wherein a multiplicity of fibers 18A–18F are mounted in a stationary manner across the entire page width.

An ultrasonic transmission system incorporating a source and acoustic fibers is disclosed in U.S. Pat. No. 3,584,327 issued on June 15, 1971 to Edward J. Murry, and is also disclosed in an article by said patentee in the publication *Ultrasonics,* Vol. 8, No. 3, July 1970, entitled "A Unique System for Transmission of Ultrasonic Energy Over Fibrous Bundles". In such publications, there is disclosed the technique of employing a bundle of flexible wires comprising, for example, 100 or more wires, each of extremely small cross-sectional areas, which form an efficient transmitter of longitudinal vibrations when fixedly secured at its opposite ends between a source of vibration, such as a sonic transformer, and a utilization device which has an acoustic impedance which at least roughly matches that of the wires. Such author also discloses that a bundle of wires made of steel, glass or the like, each only 0.002 inches in diameter and occupying an overall cross-sectional area of only 4 square millimeters, can very efficiently carry vibrational acoustic energy at power levels of as much as 100 to $10^6$ watts/cm$^2$.

Also, U.S. Pat. No. 3,029,766 to J. B. Jones, dated Apr. 17, 1962, discloses an ultrasonic tool incorporating an ultrasonic transducer which couples ultrasonic energy to a plurality of flexible transmission wires.

For the present invention, the generator 10 delivers energy in the 20–200 kHz range and the fibers 18A–18F can be made with diameters in the range of 0.1 – 100 mils. The acoustic fibers 18A–18F may vary in length, determined generally by the wave length of the sonic waves. Each fiber, 18A–18F, may comprise a bundle of wires or a single wire having an overall diameter preferably in the order of about 2–20 mils. That is, a single wire of 2–20 mil diameter can be used per fiber 18A–18F, or alternately, a plurality of fiber wires having a combined diameter of about 2–20 mils. The fibers are made from materials known for their good sonic energy transmitting properties, such as aluminum, titanium, or alloys of nickel, chromium, iron and titanium (Inconel "X").

The fibers 18A–18F are firmly supported at their ends by a retainer plate 28 which has a plurality of spaced apart openings 30 through which the fibers extend. The retainer plate 28 is a non-transmitter of sonic energy, such as hard rubber. Also, there may be provided cylindrical rubber or plastic fittings, not shown, lining each opening 30 for retaining the fibers. The ends 32 of the fibers 18A–18F are positioned to contact the surface of the ink-bearing medium 20. A support block 34 is rigidly mounted a predetermined distance apart from the surface of the retainer plate 28 such that the ink bearing medium 20 and paper 22 can pass freely therebetween. Support block 34 can be a non-conductor of sonic energy, such as clear plexiglas, plastics or hard rubber. Either or both the retainer plate 28 or the support block 34 can be adjustable to vary the gap to accommodate different thickness of ink and print materials. The retainer plate 28 can be driven by the drive motor 23 to move the ends of fibers 18A–18F across the page, normal to the plane of the drawing.

In the embodiment shown in FIG. 2A, the ink-bearing medium 20 may comprise a porous media including pores perpendicular to the paper and parallel to the propagation of the ultrasonic energy. The pores 36 have a diameter, i.e., 0.5 – 50 microns, which is smaller than that of the acoustic fibers, and are filled with an ink which exhibits very distinctive non-Newtonian flow characteristics. That is, the ink possesses a very large viscosity at zero and extremely low shear values, but the viscosity rapidly approaches a low value as the shear increases moderately. Materials which exhibit these characteristics are common and fall into the classes known as colloids and smectic liquid crystals. Such materials can incorporate suitable dyes with the colloidal inks having their non-Newtonian flow characteristics adjusted to suit the printing application. Also, such colloids and smectic liquid crystals, and wax based inks, exhibit large changes in viscosity with moderate temperature changes. As mentioned above, the ink-bearing medium 20 is in contact with the ink printing medium 22, both being fed from rollers 24 and 26. In the FIG. 2A embodiment, the porous media 20 moves simultaneously with the paper 22. However, it is noted that the porous medium 20 may be fixed, not shown, with respect to the acoustic fibers 18A–18F and continuously fed with a suitable ink while the paper 22 is moved relative to the porous medium 20. The porous medium 20 or substrates may comprise a relatively flexible plastic or metal material having the pores therein.

It is to be understood that ink-bearing medium 20 may constitute a ribbon which is individually fed into the print region in synchronism with the motion of the print head, i.e., the fiber carrier 28, in the manner conventionally employed in typewriters.

In the operation of the embodiment of FIG. 2A, the ink carrying medium 20 is in contact with the paper 22 and under the no shear condition, i.e., when ultrasonic transducers 12A–12F do not generate ultrasonic energy for transmission through the acoustic fibers 18A–18F, the viscosity of the ink in medium 20 is so great that ink seepage from the porous media to the paper is not permitted. When the ultrasonic transducers 12A–12F are selectively activated, the presence of locally applied ultrasonic energy at the ink-bearing media 20 results in increased shear, and possibly cavitation and an increased hydrostatic pressure due to acoustic streaming. This presence of energy results in a large decrease in viscosity and resultant seepage of the ink from the pores 36 onto the paper. In this connection it is noted that if the ink employed is a good ultrasonic absorber, such as colloids and wax based inks, there will be local heating of the ink with a resultant decrease in viscosity producing the same results, i.e., tinting.

FIG. 2B shows another embodiment whereby multiple copies may be simultaneously made by passing ultrasonic energy through a plurality of ink bearing media, such as carbon papers 38A, B, C and D, ink ribbon or the like, which are alternated between papers 40A, B, C and D, respectively. Carbon papers 38A–38D and papers 40A–40D may be replaced by a stack of thermal triggered media, e.g., thermal paper. The multi-layers are in contact with each other and moved in unison. Here, the ultrasonic energy applied through the fibers 18A–18F will selectively change the temperature and hence viscosity of the wax based ink on the carbon papers 38A–38D, causing a transference of the ink from the carbon papers onto the adjacent print papers 40A–40D, respectively. The sandwich of alternating ink transfer media and paper is passed over back plate 34 which, if desired, can be heated by conventional means to apply a thermal bias so that less ultrasonic energy is needed to reach the thermal threshold for transfer. Similarly, it is noted that the multi-copy papers may comprise papers having different colored ink therein so that the multi-colored printing can be accomplished. Where multi-copies are employed, such as with multi-part carbon paper forms, the ultrasonic energy has been transferred through as many as 30 copies, that is, 30 original papers and 30 carbons, whereby ink was ultrasonically transferred to each paper without any obvious tendencies for lateral spreading. This indicates the multiple copy, non-impact feature capability with non-optimum materials. Multi-color capabilities can be achieved either by using different colors on different ink bearing media or carbon papers or by distributing the colors on a given ink-bearing medium. In addition, various gradations in intensity of the ink can be achieved by applying different amounts of ultrasonic energy or varying the length of time during which the ultrasonic energy is applied in a given area, thereby providing gray scales.

Referring to FIG. 3, there is shown one conventional means for generating ultrasonic energy by ultrasonic transducers 12A–12F and coupling this energy to each of the acoustic fibers 18A–18F, respectively, such that a high resolution, ultrasonic matrix printer is provided. Specifically, the ultrasonic generating means shown is a known magnetostrictive transducer which includes an energizing coil 42 wound around a laminated nickel stack 44. Stack 44 is attached by a silver solder joint 46 to a tapered cone 48. The end 50 of cone 48 is brazed to the sonic fiber bundle or single wire 52 as shown. Both the laminated stack 44 and the tapered cone 48 and supported at their velocity nodes by nodal supports 54 and 56. The length of the cone 48 is designed to equal the wavelength $\lambda$ being generated by the ultrasonic transducer 12A–12F. The nodal support 56 is located at a distance $\lambda/4$ from the top of the cone 48. Sonic transmission wire 52 has a length which is a multiple $n$ of $\lambda/2$. The end 58 of wire 52 is tapered or stepped down to a tip which is 2–10 mils in diameter, while the wire 52 may have an overall diameter of about 1/16 of an inch. A wire support 60 is also located at a nodal point. The driving current and bias is applied to the magnetostrictive transducer from the A.C. generator 10 by means of the control unit 16 which is connected at lines 15A–15F to the terminals 62 of each coil 42. Control 16 is essentially a conventional logic circuit which electrically connects the source line 14 to its respective transducer 12A–12F in response to print command signals from a computer or other input device. A magnetostrictive transducer as described above is disclosed in "Sonics" by T. F. Hueter and R. H. Bolt, John Wiley and Sons, 1955, at page 276.

Figure 4:
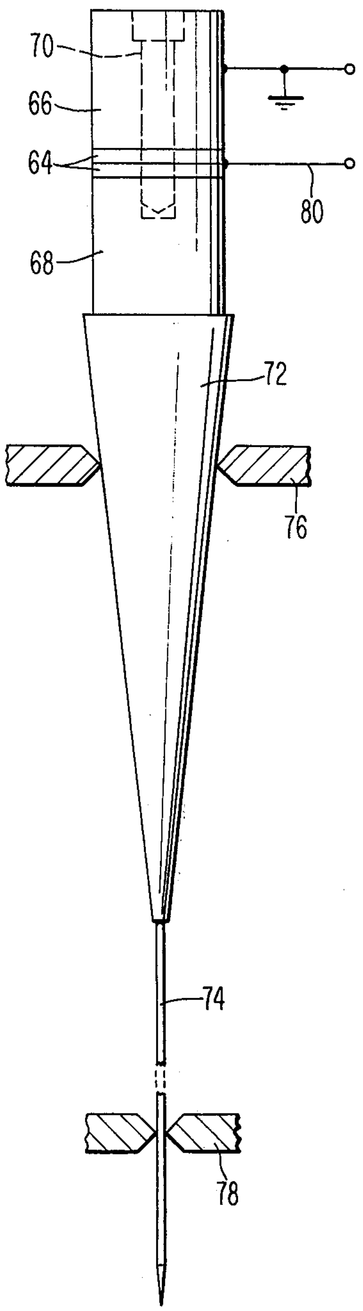
FIG. 4 shows a piezoelectric transducer employed for producing modulated ultrasonic energy into the sonic transmission medium.

Referring to FIG. 4, there is shown another type of conventional means for generating ultrasonic energy by ultrasonic transducers 12A–12F and coupling this energy to each of fibers 18A–18F. Specifically, two piezoelectric discs 64 are sandwiched between end pieces 66 and 68 by a high tension bolt 70 to maintain the compression force on the crystals. The end pieces 66 and 68 are made of a high strength material, such as aluminum or titanium. A tapered cone 72 and wire 74 are mounted by nodal supports 76 and 78, respectively, in a manner similar to that described with respect to the transducer shown in FIG. 3. Sonic energy is transmitted through the transducer and wire by switching the electrical energy from source 10 to the input wire 80 by means of control unit 16, as described above.

Figure 5:
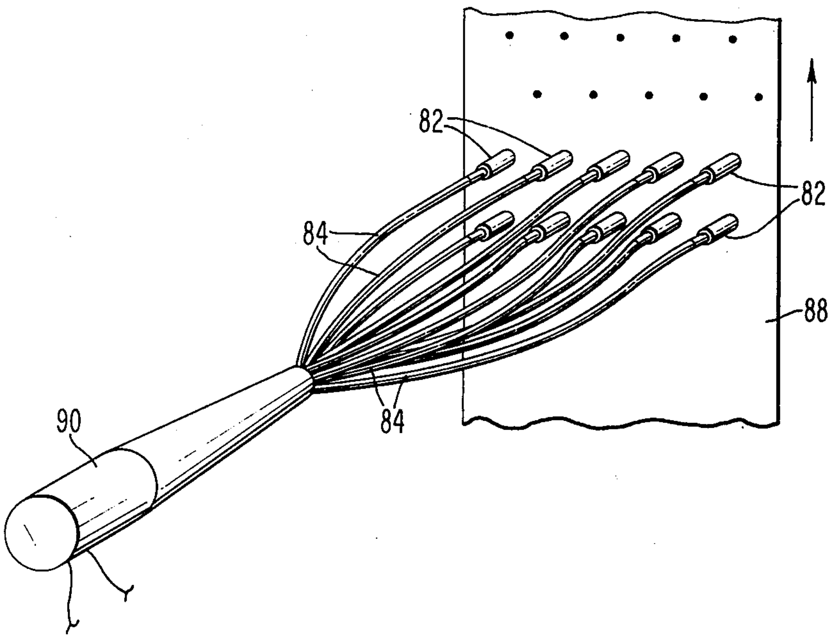
FIG. 5 shows an embodiment of the ultrasonic printer wherein printing control is accomplished by selectively actuating pistons into contact with the printing medium to transfer the ultrasonic energy thereto.
Figure 6:
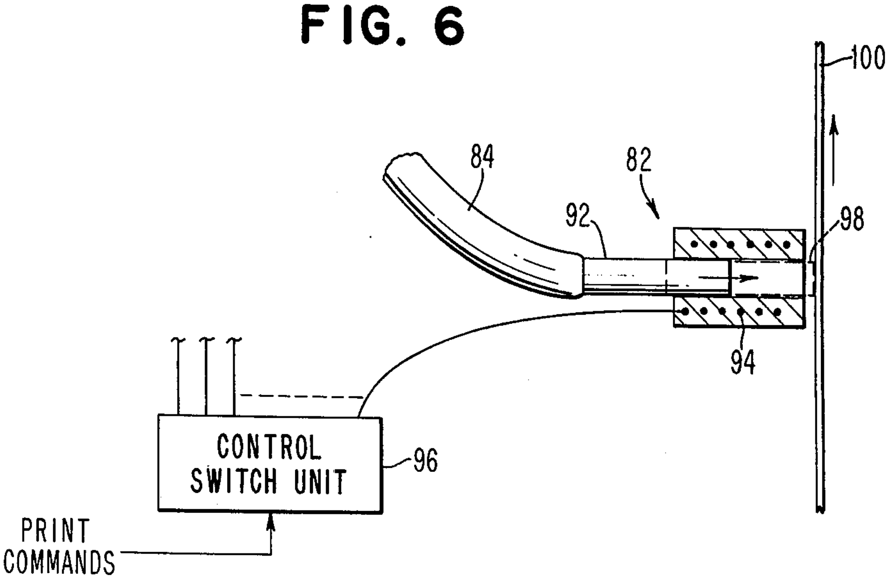
FIG. 6 is a more detailed view of the piston mechanism used in the printer of FIG. 5.

As contrasted with the above described embodiments employing an ultrasonic transducer per fiber or wire, an alternate means for delivering ultrasonic energy to the ink-bearing medium involves means on each fiber or wire for modulating the energy delivered to such ink-bearing medium. Referring to FIG. 5, there is shown an embodiment wherein modulation per fiber is accomplished by selectively actuating a contact piston for coupling the ultrasonic energy from the fibers to the ink-bearing medium. More specifically, pressure mechanisms 82 are attached at the ends of the acoustic fibers 84 to produce a controllable pressure contact of the acoustic fibers with the paper. The pressure mechanisms may comprise a hydraulic, piezoelectric or magnetically controlled device which is fixedly attached to a support member while effectively providing ultrasonic coupling of the acoustic fibers 84 against ink-bearing and paper media 88. The ultrasonic energy is coupled into the ink-bearing and paper media only when the fibers are in firm contact with the outer ink-bearing medium. In the device shown in FIG. 5, a single ultrasonic source 90 feeds a plurality of modulation devices of the contact piston type. In FIG. 6, there is shown one type of modulation device 82 comprising a magnetizable metal piston 92 that is actuated by a solenoid 94 energized by control 96. Piston 92 is moved into the broken line position 98 whereby it makes contact with the ink-bearing medium 100 and couples the ultrasonic energy thereto. In one embodiment, the piston 92 comprises a continuation of ultrasonic fiber 84 which is formed of magnetizable material, such as nickel. In another embodiment, the piston 92 comprises a nickel slug which is brazed to the end of fiber 84. The solenoid and piston assemblies are mounted on a retainer plate, not shown. When the solenoid 94 is not energized, a conventional return spring means, not shown, causes the piston 92 to return to its non-contact position shown.

The ultrasonic printer described above provides a high speed, low audible noise printing technique. Use of ultrasonic power as the print producing source also enables multiple copy and color copying to occur simultaneously. The use of the ink ribbons and carbon papers as the ink-bearing medium in contact with the paper to be printed affords a simple printing process whereby the ultrasonic energy is employed locally to transfer the ink from the substrate to the paper.

Figure 7:
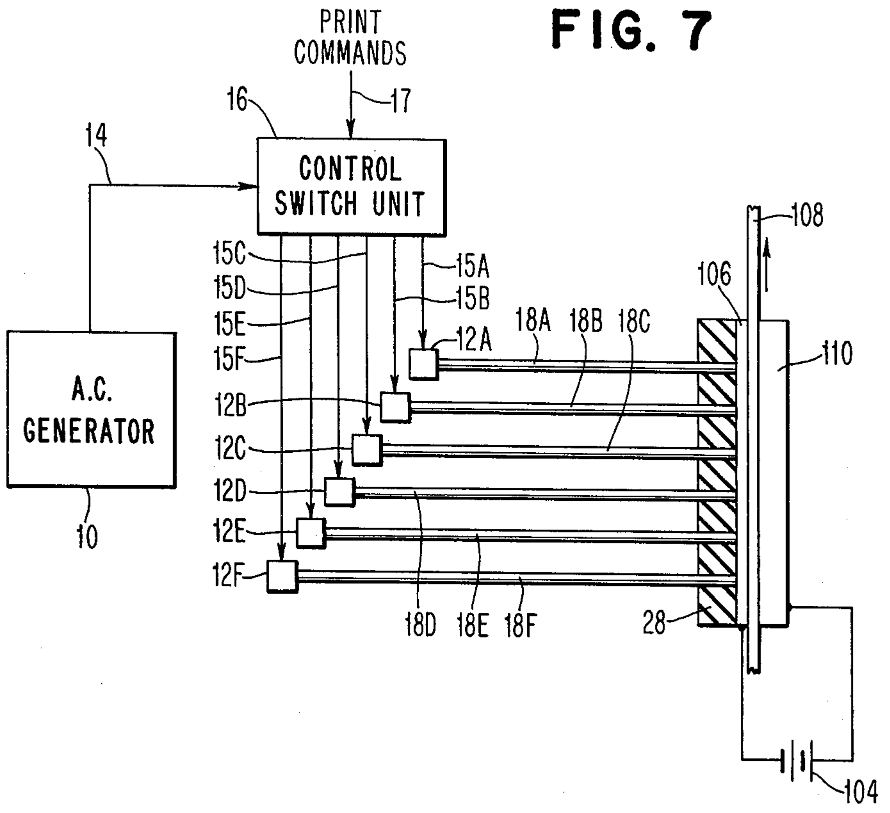
FIG. 7 shows an embodiment of the present invention wherein a static electric field is employed in combination with the ultrasonic printing device described above.

Referring to FIG. 7, there is shown a modification of the ultrasonic printing device wherein the ultrasonic energy which produces the shear forces to induce the necessary viscosity and surface tension changes is combined with a static electric field between the ink-bearing substrate and the paper as shown by a D.C. electric power supply or battery 104 applied between the viscous ink substrate 106 and the paper 108. Paper 108 is adjacent to a high voltage electrode 110. The static field applied by battery 104 provides the necessary force to attract the low viscosity ink to the paper medium. The battery 104 provides the static field which produces the necessary energy and momentum for transfer of the ink to the paper 108 from the substrate 106. The ultrasonic energy acts to reduce the viscosity and surface tension sufficiently to allow the static field produced by battery 104 to pull the ink off the substrate 106 and onto the paper 108. In this regard, it is also noted that the ink drops being removed from the substrate 106 act to carry heat away from the substrate. This provides less lateral thermal diffusion in the ink in substrate 106 and, therefore, improved printing resolution. Employment of the static field shown in FIG. 7 enables the ink printer system to operate with relatively low ultrasonic power since the static field, as mentioned above, provides some additional transfer energy and momentum to the ink.

Figure 8:
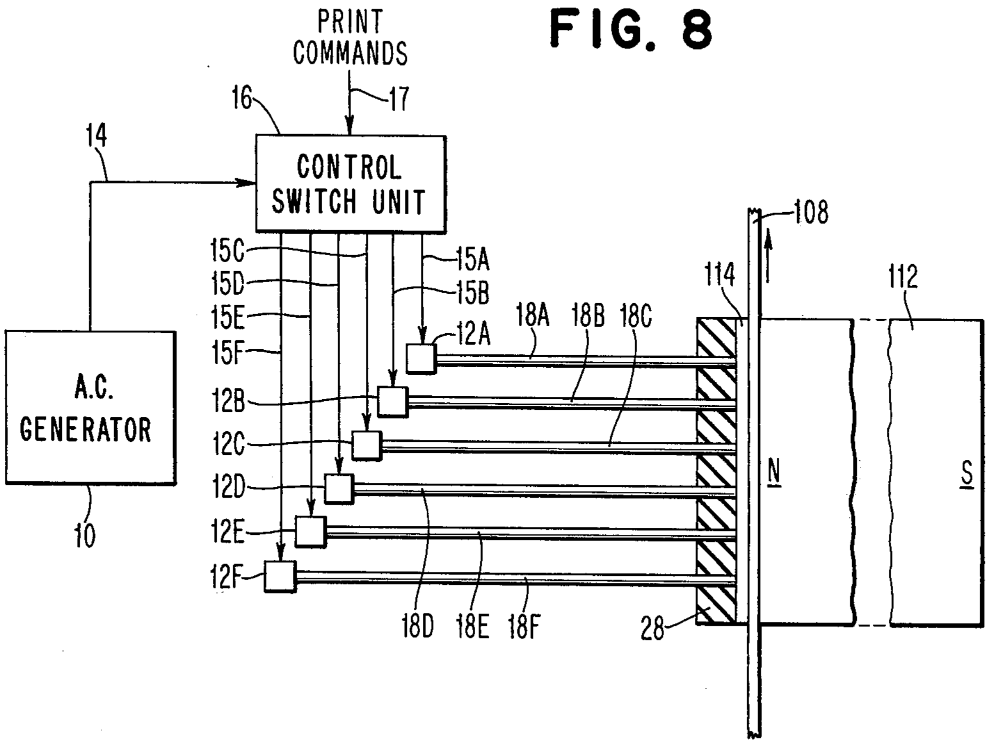
FIG. 8 shows an embodiment of the present invention wherein a magnetic field is employed in combination with the ultrasonic printing device described above.

FIG. 8 shows a further modified embodiment of the ultrasonic printer system whereby the electrostatic field shown in FIG. 7 is replaced by magnetic field producing means 112 and magnetic materials are incorporated in the viscous ink contained in the ink bearing medium 114. The magnetic field producing means 112 may be a bar magnet as shown, or a solenoid or an array of magnets. The bar magnet 112 is located behind the paper 108. Application of the ultrasonic energy to the ink-bearing medium 114 will produce the above described decrease in viscosity and resultant seepage of the ink from the porous ink media 114. Here, the magnetic field produced by the magnet 112 will provide an additional force which pulls the less-viscous ink off the media 114 and transfers it to the paper 108.

Although the above description is directed to preferred embodiments of the invention, it is noted that other variations and modifications of the printing system will be apparent to those skilled in the art and, therefore, may be made without departing from the spirit and scope of the present disclosure.

What is claimed is:

1. An ink printing system, comprising:

ultrasonic energy generating means;

an ink-bearing medium having a back surface through which ink can be transferred upon reduction of the ink viscosity;

means for providing a paper to be printed on in contact with the back surface of said ink-bearing medium;

sonic transmission means connected to said ultrasonic energy generating means for transferring sonic energy to said ink-bearing medium, said sonic transmission means including a plurality of sonic wires or bundles having their downstream ends adapted to contact said ink-bearing medium; and modulation means for selectively coupling the sonic energy from said ultrasonic energy generating means to said ink-bearing medium via said ends of said sonic wires or bundles;

whereby ultrasonic energy applied to said ink-bearing medium causes a reduction in the viscosity of the ink due to the ultrasonic vibrations and thereby transfers the ink to said print paper.

2. System as recited in claim 1, wherein said ink-bearing medium comprises one or more sheets of carbon paper or other thermally transferable materials.

3. System as recited in claim 1, wherein said ink-bearing medium comprises one or more strips of ink ribbon.

4. System as recited in claim 1, wherein said ink-bearing medium and said paper comprise a plurality of carbon papers or ink-bearing media alternatively placed between individual copies of paper for printing on multiple copies simultaneously.

5. System as recited in claim 1, wherein said ink-bearing medium has a generally planar configuration, with the back surface of said ink bearing medium in contact with said printing paper and the front surface in contact with said downstream ends of said sonic wires or bundles.

6. System as recited in claim 1, wherein said ink-bearing medium comprises a porous media having pores which contain ink having non-Newtonian flow characteristics which exhibit either large viscosity changes with small increases in temperature or which exhibit a large viscosity at zero and extremely low shear values but a relatively low viscosity at relatively high shear values.

7. System as recited in claim 6, wherein said ink-bearing medium includes pores directed perpendicular to the paper surface and parallel to the direction of propagation of ultrasonic energy at the back surface of said ink-bearing medium

8. System as recited in claim 6, wherein said pores have a general diameter in the order of 0.5–50 microns.

9. System as recited in claim 6, wherein said ink-bearing medium contains ink belonging to the classes known as colloids, smectic liquid crystals, or wax based inks.

10. System as recited in claim 1, wherein said ultrasonic energy generating means includes an A.C. generator connected to magnetostrictive transducer means, and said modulation means includes control switch means for selectively activating said magnetostrictive transducer means to couple ultrasonic energy into said sonic transmission means.

11. System as recited in claim 1, wherein said ultrasonic generating means includes an A.C. generator connected to piezoelectric transducer means, and said modulation means includes control switch means for selectively activating said piezoelectric transducer means to couple ultrasonic energy into said sonic transmission means.

12. System as recited in claim 1, wherein said sonic transmission means comprises a plurality of individual sonic wires or bundles or wires, each having an overall diameter in the order of 2–20 thousandths of an inch.

13. System as recited in claim 1, including means for supporting said sonic wires or bundles such that said downstream ends make firm contact with said ink-bearing medium.

14. System as recited in claim 1, further comprising means for feeding said ink-bearing medium and said paper into the print area adjacent the downstream ends of said sonic wires or bundles.

15. System as recited in claim 1, including a support plate mounted at a spaced apart distance from the ends of said sonic wires or bundles to provide a gap therebetween in which said ink-bearing medium and said paper is located.

16. System as recited in claim 1, further comprising static electric field generating means connected to produce an electric field between said paper and said ink-bearing medium, wherein the latter comprises a porous ink-bearing substrate.

17. System as recited in claim 1, further comprising magnetic field producing means for providing a magnetic field between said paper and said ink-bearing medium, wherein the latter comprises a porous substrate containing ink with magnetic materials.

18. System as recited in claim 1, wherein said porous ink-bearing medium and said paper are together constituted by one or more sheets of thermal paper or other thermally triggered medium.

19. An ink printing system, comprising:

ultrasonic energy generating means;

an ink-bearing medium having a back surface from which ink can be transferred upon reduction of the ink viscosity;

means for providing a paper to be printed on adjacent to or in contact with the back surface of said ink-bearing medium;

sonic transmission means connected to said ultrasonic energy generating means for transferring sonic energy to said ink-bearing medium, said sonic transmission means including a plurality of sonic wires or bundles having their downstream ends adapted to contact said ink-bearing medium; and modulation means for selectively coupling the sonic energy from said ultrasonic energy generating means to said ink-bearing medium via said ends of said sonic wires or bundles, modulation means including a contact piston which is ultrasonically coupled to the ends of each of said sonic wires or bundles, said contact piston being mounted adjacent said ink-bearing medium and being activated to cause selected ones of said contact pistons to move into contact with said ink-bearing medium and thereby transfer ultrasonic energy thereto;

whereby ultrasonic energy applied to said ink-bearing medium causes a reduction in the viscosity of the ink due to the ultrasonic vibrations and thereby transfers the ink to said print paper.

20. System as recited in claim 19, wherein said modulation means include control switch means connected to each of said contact pistons to activate combinations of pistons in response to print commands.

21. System as recited in claim 19, wherein a single ultrasonic energy generator is connected to supply a plurality of said sonic wires or bundles.

22. An ink printing system, comprising:

ultrasonic energy generating means;

a porous ink-bearing medium comprising a substrate having pores containing ink with non-Newtonian flow characteristics which exhibit either large viscosity changes with small increases in temperature or which exhibit a large viscosity at zero and extremely low shear values but a relatively low viscosity at relatively high shear values, said pores being included on the back surface of said substrate;

means for providing a paper to be printed on adjacent to or in contact with the back surface of said ink-bearing medium;

sonic transmission means connected to said ultrasonic energy generating means for transferring sonic energy to said ink-bearing medium, said sonic transmission means including a plurality of sonic wires or bundles having their downstream ends adapted to contact said ink-bearing medium; and modulation means for selectively coupling the sonic energy from said ultrasonic energy generating means to said ink-bearing medium via said ends of said sonic wires or bundles;

whereby ultrasonic energy applied to said ink-bearing medium causes a reduction in the viscosity of the ink due to the ultrasonic vibrations and thereby transfers the ink to said print paper.

23. An ink printing system, comprising:

ultrasonic energy generating means;

an ink-bearing medium having a back surface through which ink can be transferred upon reduction of the ink viscosity;

means for providing a paper to be printed on adjacent to or in contact with the back surface of said ink-bearing medium;

sonic transmission means connected to said ultrasonic energy generating means for transferring sonic energy to said ink-bearing medium, said sonic transmission means including a plurality of sonic wires or bundles having their downstream ends adapted to contact said ink-bearing medium; and modulation means for selctively coupling the sonic energy from said ultrasonic energy generating means to said ink-bearing medium via said ends of said sonic wires or bundles, said modulation means including a contact piston which is ultrasonically coupled to the ends of each of said sonic wires or bundles, said contact piston being mounted adjacent said ink-bearing medium and being activated to cause selected ones of said contact pistons to move into contact with said ink-bearing medium and thereby transfer ultrasonic energy thereto.

24. System as recited in claim 23, wherein each of said contact pistons are driven by an electromagnetic solenoid around each piston, said solenoid being electrically connected to receive the output from a control switch means in response to print commands.

25. System as recited in claim 23, wherein each of said contact pistons comprises a nickel slug which is attached to the end of a sonic wire or sonic bundle.

26. System as recited in claim 23, wherein each of said contact pistons comprises a continuation of said sonic wire or sonic bundle.

27. A method of printing, comprising:

selectively transmitting ultrasonic energy along sonic transmission wires or bundles to an ink-bearing medium;

locating said ink-bearing medium in contact with the paper to be printed on;

ultrasonically applying said ultrasonic energy to said ink-bearing medium in a manner whereby the viscosity of said ink is reduced resulting in the seepage of the ink from the ink-bearing medium, and transferral on to said printing paper.

28. Method as recited in claim 27, wherein said step of selectively transmitting ultrasonic energy is accomplished by modifying the sonic transmission by sonic transducer means.

29. Method as recited in claim 27, wherein said step of selectively transmitting sonic energy is accomplished by moving the end of said sonic transmission wires or bundles into closer physical contact with the ink-bearing medium.

* * * * *